(12) United States Patent
Baig et al.

(10) Patent No.: US 10,419,401 B2
(45) Date of Patent: Sep. 17, 2019

(54) METHODS AND SYSTEMS FOR SECURING DATA IN THE PUBLIC CLOUD

(71) Applicant: Capital One Services, LLC, McLean, VA (US)

(72) Inventors: Attaullah Baig, Round Rock, TX (US); Vishal Parikh, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 156 days.

(21) Appl. No.: 15/378,023

(22) Filed: Dec. 13, 2016

(65) Prior Publication Data

US 2017/0201498 A1 Jul. 13, 2017

Related U.S. Application Data

(60) Provisional application No. 62/276,623, filed on Jan. 8, 2016.

(51) Int. Cl.
| | |
|---|---|
| *H04L 29/06* | (2006.01) |
| *G06F 7/04* | (2006.01) |
| *G06F 21/62* | (2013.01) |
| *H04L 9/06* | (2006.01) |

(52) U.S. Cl.
CPC ...... *H04L 63/0428* (2013.01); *G06F 21/6254* (2013.01); *H04L 9/0618* (2013.01); *G06F 2212/402* (2013.01)

(58) Field of Classification Search
CPC ............ H04L 63/0428; H04L 9/0618; G06F 21/6254; G06F 2212/402
USPC ............ 713/153, 165, 166; 726/26, 27
See application file for complete search history.

(56) References Cited

U.S. PATENT DOCUMENTS

| | | | |
|---|---|---|---|
| 7,584,149 B1 | 9/2009 | Bishop et al. | |
| 7,864,952 B2 | 1/2011 | Pauker et al. | |
| 8,782,403 B1 | 7/2014 | Satish et al. | |
| 9,946,895 B1* | 4/2018 | Kruse | G06F 21/6245 |
| 2004/0068652 A1 | 4/2004 | Carpentier et al. | |
| 2006/0224887 A1 | 10/2006 | Vesikivi et al. | |
| 2012/0174208 A1 | 7/2012 | Sperling et al. | |
| 2012/0324225 A1 | 12/2012 | Chambers et al. | |
| 2013/0125208 A1 | 5/2013 | Doukhvalov et al. | |
| 2014/0122890 A1 | 5/2014 | Prot et al. | |
| 2014/0164768 A1* | 6/2014 | Kruglick | H04L 63/062 713/168 |

(Continued)

OTHER PUBLICATIONS

Terence Spies, Feistel Finite Set Encryption Mode, 2008, Voltage Security, Inc. (10 pages).

(Continued)

*Primary Examiner* — Aravind K Moorthy
(74) *Attorney, Agent, or Firm* — Finnegan, Henderson, Farabow, Garrett & Dunner LLP

(57) ABSTRACT

Computer implemented systems and methods are provided for securing data. In some embodiments, a system for securing data may comprise one or more processors configured to receive a request for data over a network. The one or more processors may be configured to identify one or more confidential portions of data within the requested data. The one or more processors may be further configured to transmit the confidential portions of data to a hardware device configured to secure the confidential portions of data, and receive the secured data from the hardware device.

19 Claims, 15 Drawing Sheets

(56) References Cited

U.S. PATENT DOCUMENTS

| | | | | |
|---|---|---|---|---|
| 2014/0325232 | A1* | 10/2014 | Schultz | H04L 63/0823 713/175 |
| 2015/0154031 | A1* | 6/2015 | Lewis | G06F 9/4406 713/2 |
| 2015/0186669 | A1* | 7/2015 | Nicolaou | G06F 21/6218 726/4 |
| 2015/0309829 | A1* | 10/2015 | Hiltgen | G06F 9/45545 718/1 |
| 2016/0057107 | A1* | 2/2016 | Call | H04L 63/02 726/11 |
| 2016/0098567 | A1* | 4/2016 | Yeh | G06F 21/60 726/26 |
| 2016/0373412 | A1* | 12/2016 | MacCarthaigh | H04L 63/0428 |
| 2017/0134427 | A1* | 5/2017 | Hutchins | H04L 63/20 |
| 2018/0137310 | A1* | 5/2018 | Schenk | G06F 21/85 |

OTHER PUBLICATIONS

Bellare et al., The FFX Mode of Operation for Format-Preserving Encryption, Draft 1.1, Feb. 20, 2010 (18 pages).

Bellare et al., Addendum to the FFX Mode of Operation for Format-Preserving Encryption, Draft 1.0, Sep. 3, 2010 (5 pages).

Morris Dworkin, Recommendation for Block Cipher Modes of Operation: Methods for Format-Preserving Encryption, Draft, Jul. 2013, NIST Special Publication 800-38G, National Institute of Standards and Technology (30 pages).

International Search Report and Written Opinion dated Apr. 28, 2017 for PCT/US2016/069191 filed Dec. 29, 2016 (11 pages).

\* cited by examiner

900

METHODS AND SYSTEMS FOR SECURING DATA IN THE PUBLIC CLOUD

PRIORITY CLAIM

This application claims priority under 35 U.S.C. § 119 to U.S. Provisional Application No. 62/276,623, filed on Jan. 8, 2016, and entitled "Methods and Systems for Securing Data in the Public Cloud," which is expressly incorporated herein by reference in its entirety.

TECHNICAL FIELD

The disclosed embodiments relate to field level encryption of shared data in computer networks.

BACKGROUND

Computer networking has improved immensely over time in both speed and reliability. With these improvements, certain efficiencies have been achieved by moving computing tasks involving large resource requirements away from severs within individual organizations to shared resources, often operated by third parties. Commonly known as "cloud computing" or "the cloud," these networked computing resources can often meet or exceed the capabilities of on-site servers within an organization. But communication between cloud resources may require transmitting data over public or shared network links, which typically increases the risk that confidentiality of the information is lost.

A traditional solution to protecting confidential data is to encrypt entire databases at rest. But such universal encryption may be unable to protect data in use within various computing resources, particularly when the resources may be located within multiple locations connected by shared or public communications links.

In view of the shortcomings of current systems, improved methods and systems for securing data are desired.

SUMMARY

Disclosed embodiments provide methods and systems for securing sensitive data in the public cloud.

Consistent with the present embodiments, a system for securing data is provided. The system may include one or more processors and a memory having instructions stored thereon. When executed by the one or more processors, the instructions may cause the one or more processors to receive a request for data over a network, identify one or more confidential portions of data within the requested data, transmit the confidential portions of data to a hardware device configured to secure the confidential portions of data, and receive the secured data from the hardware device.

Consistent with the present embodiments, a system for encrypting field level data is provided. The system may include one or more processors and a memory having instructions stored thereon. When executed by the one or more processors, the instructions may cause the one or more processors to receive data over a network, verify that the data conforms to a particular format, generate random bits of data of a particular length, transmit the received data and the random bits to an encryption device, receive encrypted data from the encryption device, append the random bits to the encrypted data, and append, to the encrypted data, information identifying an encryption key for the encrypted data.

Consistent with the present embodiments, a method of allocating connections to networked computer resources is provided. The method may comprise receiving a request for a access to a networked computer resource, randomly selecting a connection of a plurality of connections, waiting for the selected connection to become available, after the connection becomes available, establishing the connection to the resource, receiving an indication that use of the resource is complete, and terminating the connection to the resource.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

The disclosed embodiments are directed to systems and methods for protecting information using cloud computing resources.

Often, data may need to be shared between various departments or lines-of-business within an organization, across multiple computer systems and networks. While the data may be protected in various ways as a whole, for example by encrypting entire databases or volumes, such methods of protection may be ineffective while the data is in use. For example, data may be compromised or exposed by a breach in security, user error, or stolen access credentials (e.g., username and password). The following description provides examples of systems and methods for protecting particular pieces of sensitive information within transferred data. Referred to herein as field level data, this data may include information such as account numbers, social security numbers, and any other secret, private, or personally identifying pieces of information. The described systems and methods may allow various systems, departments, and/or lines of business to exchange and use data while protecting the security of field level data in the event that the security of the data as a whole is compromised.

Figure 1:
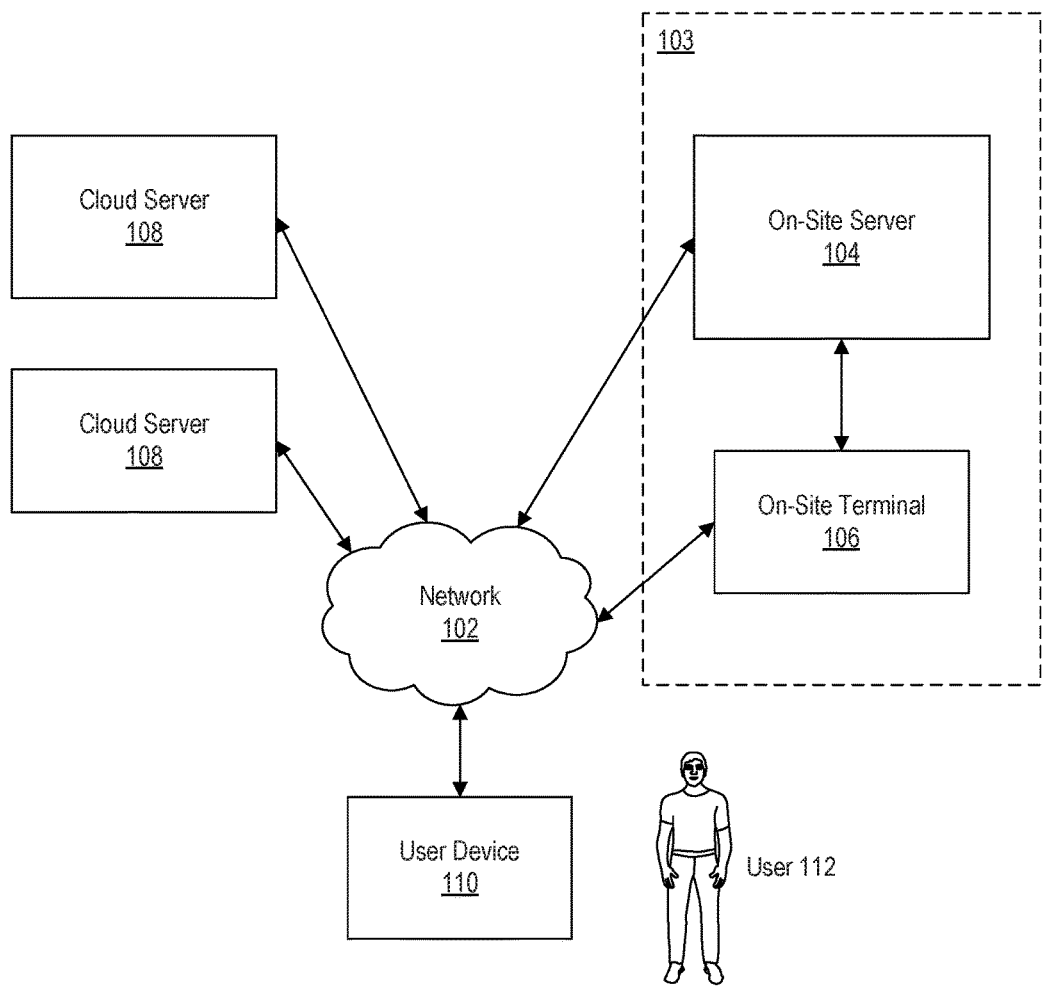
FIG. 1 is a diagram of an exemplary cloud computing system that may be configured such that an organization may arrange for computing processes to be securely performed offsite from the organization, consistent with disclosed embodiments.

FIG. 1 shows a diagram of an exemplary cloud computing system 100 that may be configured such that an organization 103 may arrange for some or all of its computing processes to be securely performed offsite from the organization. The components and arrangements shown in FIG. 1 are not intended to limit the disclosed embodiments, as the components used to implement the disclosed processes and features may vary.

In accordance with disclosed embodiments, cloud computing system 100 may include an on-site server 104, an on-site terminal 106, one or more cloud servers 108, and a user device 110. On-site server 104, on-site terminal 106, cloud server 108, and user device 110 may communicate through network 102. On-site server 104 and on-site terminal 106 may be disposed within organization 103. In some embodiments on-site server 104 and on-site terminal 106 may be physically disposed within an office building or physical location associated with organization 103; however, on-site server 104 and on-site terminal 106 may also be disposed in physically separate locations but connected via a network administered by or associated with organization 103.

User 112 may be associated with an organization 103, such as an individual who holds accounts with, purchases services from, or otherwise interacts with the organization. As such, user 112 may operate user device 110 to access data via system 100. User 112 may also be an employee, member, or contractor of organization 103 and, as such, may operate on-site terminal in addition to or instead of user device 110.

User device 110 may be connected to on-site server 104 and/or cloud server 108 directly or via network 102. Other components known to one of ordinary skill in the art may be included in system 100 to gather, process, transmit, receive, and provide data consistent with the disclosed embodiments.

User device 110 and on-site terminal 106 may comprise personal computing devices such as, for example, general purpose or notebook computers, mobile devices with computing ability, tablets, smartphones, wearable devices such as Google Glass™ or smart watches, or any combination of these computers and/or affiliated components.

On-site server 104 may be operated by any organization requiring access to networked computing resources, such as a business, bank, credit card company, merchant, lender, and the like. On-site server 104 may be a computer-based system including computer system components, desktop computers, workstations, tablets, hand held computing devices, memory devices, and/or internal network(s) connecting the components.

Network 102 may comprise any type of computer networking arrangement used to exchange data. For example, network 102 may be the Internet, a private data network, virtual private network using a public network, and/or other suitable connection(s) that enables system 100 to send and receive information between the components of system 100. Network 102 may also include a public switched telephone network ("PSTN") and/or a wireless network.

One or more cloud servers 108 may be operated by a provider of cloud computing services such as Amazon Web Services, Google Cloud Platform, Rackspace Cloud, etc. User device 110 and/or on-site server 104 may receive information from cloud server 108 such as, for example, credit card information, information associated with an account controlled by user 112, information used in ecommerce, or any other information that may be used in the normal course of operation of organization 103. Any number of cloud servers 108 may be included in system 100, and cloud server 108 may comprise any number of physical, virtual, shared, or distributed devices.

Figure 2:
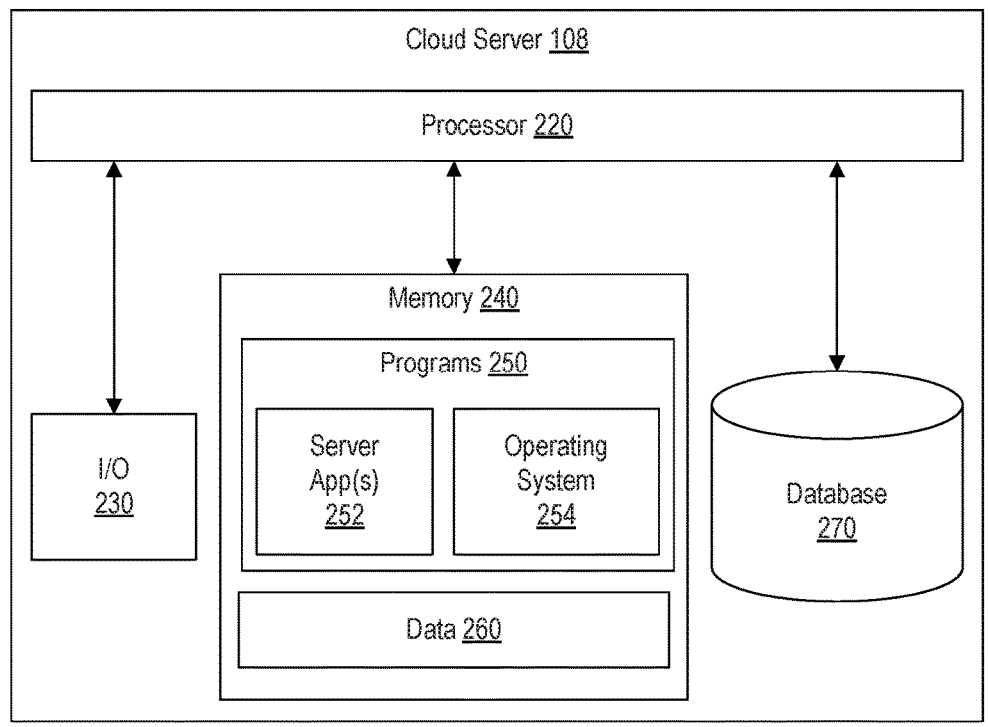
FIG. 2 is a diagram of an exemplary cloud computing server, consistent with disclosed embodiments.

FIG. 2 shows a diagram of an exemplary cloud server 108, consistent with disclosed embodiments. As shown, cloud server 108 may include one or more of processors 220, input/output ("I/O") devices 230, memory 240 storing programs 250 including, for example, server app(s) 252, operating system 254, and storing data 260, and a database 270. Cloud server 108 may be a single server or may be configured as a distributed computer system including multiple servers or computers that interoperate to perform one or more of the processes and functionalities associated with the disclosed embodiments.

Processor 220 may be one or more known processing devices, such as a microprocessor from the Pentium™ family manufactured by Intel™ or the Turion™ family manufactured by AMD™. Processor 220 may constitute a single core or multiple core processors that executes parallel processes simultaneously. For example, processor 220 may be a single core processor configured with virtual processing technologies. In certain embodiments, processor 220 may use logical processors to simultaneously execute and control multiple processes. Processor 220 may implement virtual machine technologies, or other known technologies to provide the ability to execute, control, run, manipulate, store, etc. multiple software processes, applications, programs, etc. In another embodiment, processor 220 may include a multiple-core processor arrangement (e.g., dual, quad core, etc.) configured to provide parallel processing functionalities to allow cloud server 108 to execute multiple processes simultaneously. One of ordinary skill in the art would understand that other types of processor arrangements could be implemented that provide for the capabilities disclosed herein.

Cloud server 108 may also include one or more I/O devices 230 that may comprise one or more interfaces for receiving signals or input from devices and providing signals or output to one or more devices that allow data to be received and/or transmitted by on-site server 104. For example, cloud server 108 may include interface components, which may provide interfaces to one or more input devices, such as one or more keyboards, mouse devices, and the like, that enable cloud server 108 to receive input from a user, such as user 112.

Cloud server 108 may include one or more storage devices configured to store information used by processor 220 (or other components) to perform certain functions related to the disclosed embodiments. In one example, Cloud server 108 may include memory 240 that includes instructions to enable processor 220 to execute one or more applications, such as server applications, an electronic transaction application, network communication processes, and any other type of application or software known to be available on computer systems. Alternatively or additionally, the instructions, application programs, etc. may be stored in an internal database 270 or external storage in direct communication with cloud server 108 (not shown), such as one or more database or memory accessible over network 102. Database 270 or other external storage may be a volatile or non-volatile, magnetic, semiconductor, tape, optical, removable, non-removable, or other type of storage device or tangible (i.e., non-transitory) computer-readable medium.

In one embodiment, cloud server 108 may include memory 240 that includes instructions that, when executed by processor 220, perform one or more processes consistent with the functionalities disclosed herein. Methods, systems, and articles of manufacture consistent with disclosed embodiments are not limited to separate programs or computers configured to perform dedicated tasks. For example, cloud server 108 may include memory 240 that may include one or more programs 250 to perform one or more functions of the disclosed embodiments. Moreover, processor 220 may execute one or more programs located remotely from system 100. For example, cloud server 108 may access one or more remote programs, that, when executed, perform functions related to disclosed embodiments.

Programs 250 stored in memory 240 and executed by processor(s) 220 may include one or more server app(s) 252 and operating system 254. Server app(s) 252 may incorporate one or more financial services apps that cause processor(s) 220 to execute one or more processes related to financial services provided to customers including, but not limited to, processing credit and debit card transactions, checking transactions, fund deposits and withdrawals, transferring money between financial accounts, lending loans, processing payments for credit card and loan accounts, retrieving and displaying account information, etc.

Memory 240 and database 270 may include one or more memory devices that store data and instructions used to perform one or more features of the disclosed embodiments. Memory 240 and database 270 may also include any combination of one or more databases controlled by memory controller devices (e.g., server(s), etc.) or software, such as document management systems, Microsoft SQL databases, Share Point databases, Oracle™ databases, Sybase™ databases, or other relational databases.

Cloud server 108 may also be communicatively connected to one or more remote memory devices (e.g., remote databases (not shown)) through network 102 or a different network. The remote memory devices may be configured to store information and may be accessed and/or managed by cloud server 108. By way of example, the remote memory devices may be document management systems, Microsoft SQL database, Share Point databases, Oracle™ databases, Sybase™ databases, or other relational databases. Systems and methods consistent with disclosed embodiments, however, are not limited to separate databases or even to the use of a database.

While on-site server 104 may not necessarily be configured in an identical or similar way to cloud server 108, any of the above components and configurations described with respect to cloud server 108 could also apply to on-site server 104. Alternatively, some components, configurations, or features of cloud server 108 may be similar or identical between cloud server 108 and on-site server 104 in order to provide back-up service, should one of the servers go offline due to malfunction or maintenance.

The following embodiments are described as performed primarily by cloud server 108. In some embodiments, however, on-site server 104 may be used in place of cloud server 108 for some or all of the disclosed steps or functions. Furthermore, the following embodiments are described as performed for data associated with user 112. In some embodiments, however, system 100 may be used to secure data associated with any number of users or businesses, internal data exchanged between various lines of business within organization 103, etc.

Figure 3:
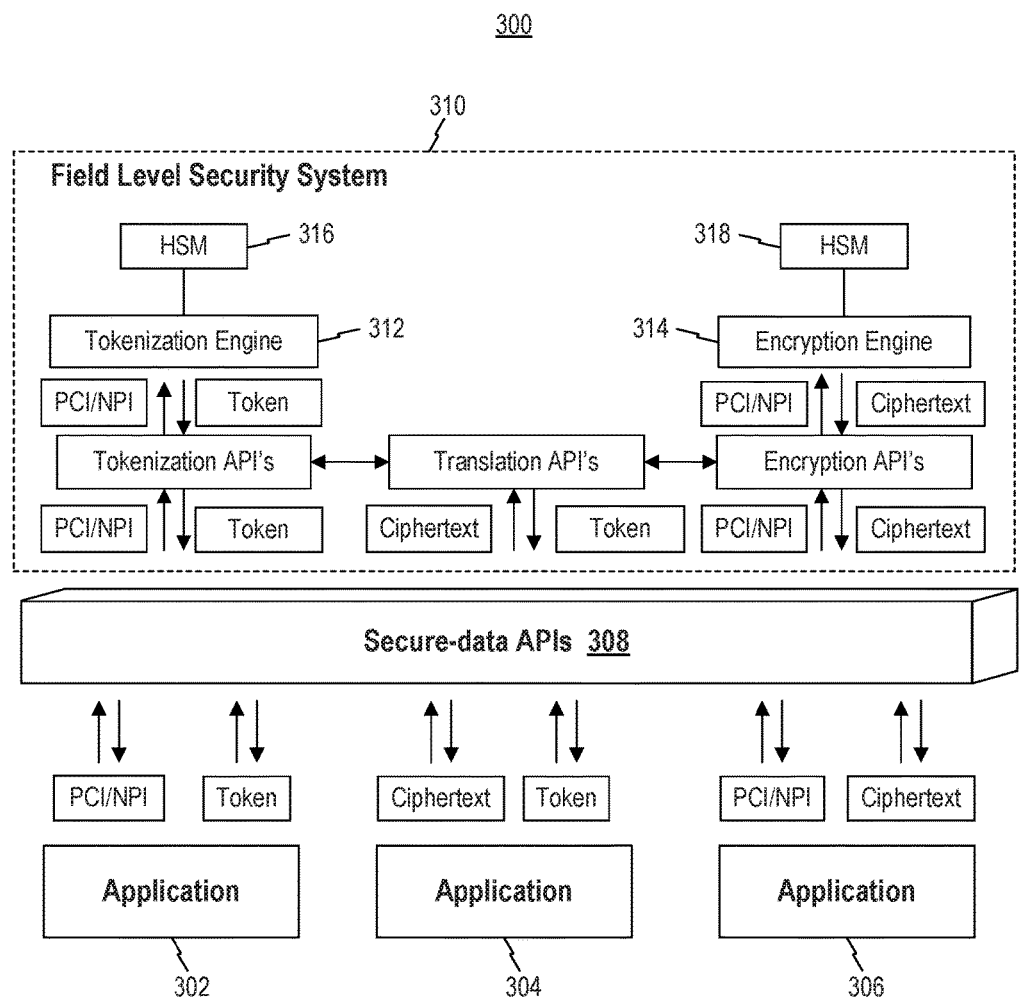
FIG. 3 is a diagram of an exemplary data security subsystem, consistent with disclosed embodiments.

FIG. 3 is a diagram of an exemplary data security subsystem 300. Data security subsystem 300 may secure sensitive field level data such that the data will be protected while in use within system 100. For example, data security subsystem 300 may allow applications 302, 304, and/or 306 to access and/or secure data such as Payment Card Industry (PCI) or National Provider Identifier (NPI). Such information may include credit card numbers, bank routing and account numbers, social security numbers, patient identification numbers, or other confidential information.

Applications 302, 304, and 306 may include any application in use within organization 103, such as a loan processing application, an application that detects missed payments and/or reports missed payments to credit reporting agencies, or an application that processes payment transactions. Applications 302, 304, and 306 may be used by various departments, lines of business, customers, and/or third-parties and may be involved in exchange of information between any such entities associated with organization 103. Applications 302, 304, and 306 may be included among server app(s) 252 of cloud server 108 or on-site server 104 and may have various security capabilities and data format requirements based, for example, on the age of the software and the security capabilities available at the time of development, the level of security needed given the applications intended use, or industry standards set outside of organization 103. Based on the needs of the application, applications 302, 304, and 306 may request a field level security system 310 to perform various security functions on field level data.

Field level security system 310 may be included among app(s) 252 of cloud server 108 or on-site server 104. Field level security system 310 may perform security functions on field level data, including accepting or providing unencrypted data, tokenized field level data, and/or ciphertext field level data based on requests or requirements of applications 302, 304, and 306. As shown in FIG. 3, field level security system 310 may also translate between tokenized, encrypted, and standard versions of field level data.

Applications 302, 304, and 306, may request security functions performed by field level security system 310 via secure-data application program interfaces (APIs) 308. Secure-data APIs may include a set of protocols for requesting information within system 100. For example, secure-data APIs 308 may comprise APIs conforming to representational state transfer (REST) standards (i.e., RESTful APIs). Further, secure-data APIs 308 may require mutual authentication. As a more specific example, an application 302, 304, or 306 may establish a secure connection with field level security system 310, such as a Secure Sockets Layer (SSL) or Transport Security Layer (TLS) connection. Via the secure connection, the application may call a secure-data API 308, provide data to or request data from field level security system 310, and receive a result from field level security system 310. Examples of secure-data APIs 308 may be protocols for tokenizing, detokenizing, encrypting, and/or decrypting data.

Tokenization of field level data may refer to a process for replacing a unit of data with a random (or pseudorandom), often temporary, identifier (a token), which is then used in place of the original data. Often, the token can be used in place of original data, such as a credit card number or social security number, in existing systems. However, if the token is intercepted, stolen, or otherwise exposed to an unauthorized user or system, it may be difficult or impossible for the unauthorized user or system to discover the original information based on the token. The token can then be discarded and a new one created based on the original data.

Detokenization may refer to a process of exchanging a token for the information upon which the token was created. Examples of processes for tokenization and detokenization are described in further detail below, however, any number of methods of tokenization and detokenization may be used within system 100.

Encryption of field level data may refer to a process for applying an algorithm to replace a unit of data with ciphertext created based on the data. One or more keys may be used to describe a transformation to be applied to the data. The key(s) may then be kept secret such that it may be difficult or impossible to undo the transformation without access to the key(s). Ciphertext may be created based on a wide variety of standards and algorithms. Examples may include symmetric key algorithms, such as the Data Encryption Standard (DES) or Advanced Encryption Standard (AES), or asymmetric key algorithms, such as Rivest-Shamir-Adleman (RSA). Decryption may refer to a process for returning ciphertext back to its original data based on the key(s) used to create the ciphertext or other key(s) specifically for decrypting the data.

Ciphertext may be created to conform to numerous formats, however, ciphertext is often incompatible with existing systems unless it is first decrypted. Such incompatibility may be caused by ciphertext that is structured differently than the data used to create it (e.g., greater number of characters). Further, in many implementations, encryption may result in different ciphertext for multiple encrypted instances of the same data. Thus, indexing to enable search based on the original data may be difficult or impossible. Examples of processes for encryption and decryption are described in further detail below, however, any number methods of encryption may be used to generate and decode ciphertext within system 100.

Various applications may accept different forms of field level data. As shown in FIG. 3, application 302 may accept PCI/NPI information and/or token information, application 304 may accept token information and/or ciphertext, and application 306 may accept PCI/NPI information and/or ciphertext. These combinations are provided as examples. In some embodiments, other combinations of secured or unsecured field level data may be accepted by applications such as 302, 304, and 306.

Tokenization and encryption may be respectively performed by tokenization engine 312 and encryption engine 314. Tokenization engine 312 and encryption engine 314 may be implemented in software, provided by a third-party vendor, or implemented entirely or in part as hardware devices configured specifically for tokenization and/or encryption. As an example, FIG. 3 shows hardware security modules (HSM) 316 and 318.

HSMs 316 and 318 may be specialized hardware devices used to perform encryption and/or any processes involved in tokenization that require encryption. HSMs 316 and 318 may manage keys involved in the encryption process such that the keys do not leave the HSM. HSMs may be tamper resistant such that unauthorized attempts to access the keys stored in an HSM (such an attempt to "hack" the device over a network connection or physically turning a screw to open the case of the device) may be logged, reported, or trigger erasure of the keys. HSMs 316 and 318 may be located in a common physical location with some or all of the other components involved in field level security system 310, or may be located remotely and communicate with field level security system 310 over a network connection. HSMs located in a common location with other components may be devices installed internal to another device and may be connected via any appropriate connection or protocol (e.g. SATA, PCI, etc.). A remote connection with HSMs 316 and 318 may connected via any appropriate networking connection and may be secured using a variety of network security standards, such as any of the public-key cryptography standards (PKCS), TLS, or SSL. HSMs 316 and 318 may be connected such that keys may be securely replicated between HSM 316, HSM 318, and/or other HSMs associated with system 100 and/or organization 103.

Figure 4:
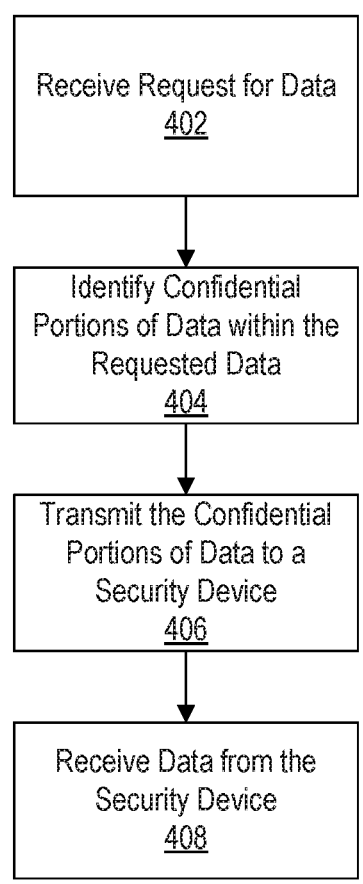
FIG. 4 is a flowchart of an exemplary method for securing data, consistent with disclosed embodiments.

FIG. 4 shows a flowchart of an exemplary process 400 for securing data. Process 400 may be performed, for example, by data security subsystem 300.

In step 402, data security subsystem 300 may receive a request for data. For example, data security subsystem may receive a request for financial records, ecommerce records, or other similar information from one of applications 302, 304, or 306. Additional details with regard to this step can be found in FIG. 5, step 502.

In step 404, data security subsystem 300 may identify one or more confidential portions of data within the requested data. For example, data security subsystem 300 may identify information such as a social security number or a credit card number. Additional details with regard to this step can be found in FIG. 5, step 504.

In step 406, data security subsystem 300 may transmit the confidential portions of data to a security device. The security device may be a hardware or software system configured to perform functions to protect the privacy and/or secrecy of the confidential portions of the data. Additional details with regard to this step can be found in FIG. 5, steps 508-520.

In step 408, data security subsystem 300 may receive data from the security device. The received data may be encrypted, decrypted, tokenized, or detokenized data, based on the confidential portions of the data. Additional details with regard to this step can be found in FIG. 5, steps 508-520.

Figure 5:
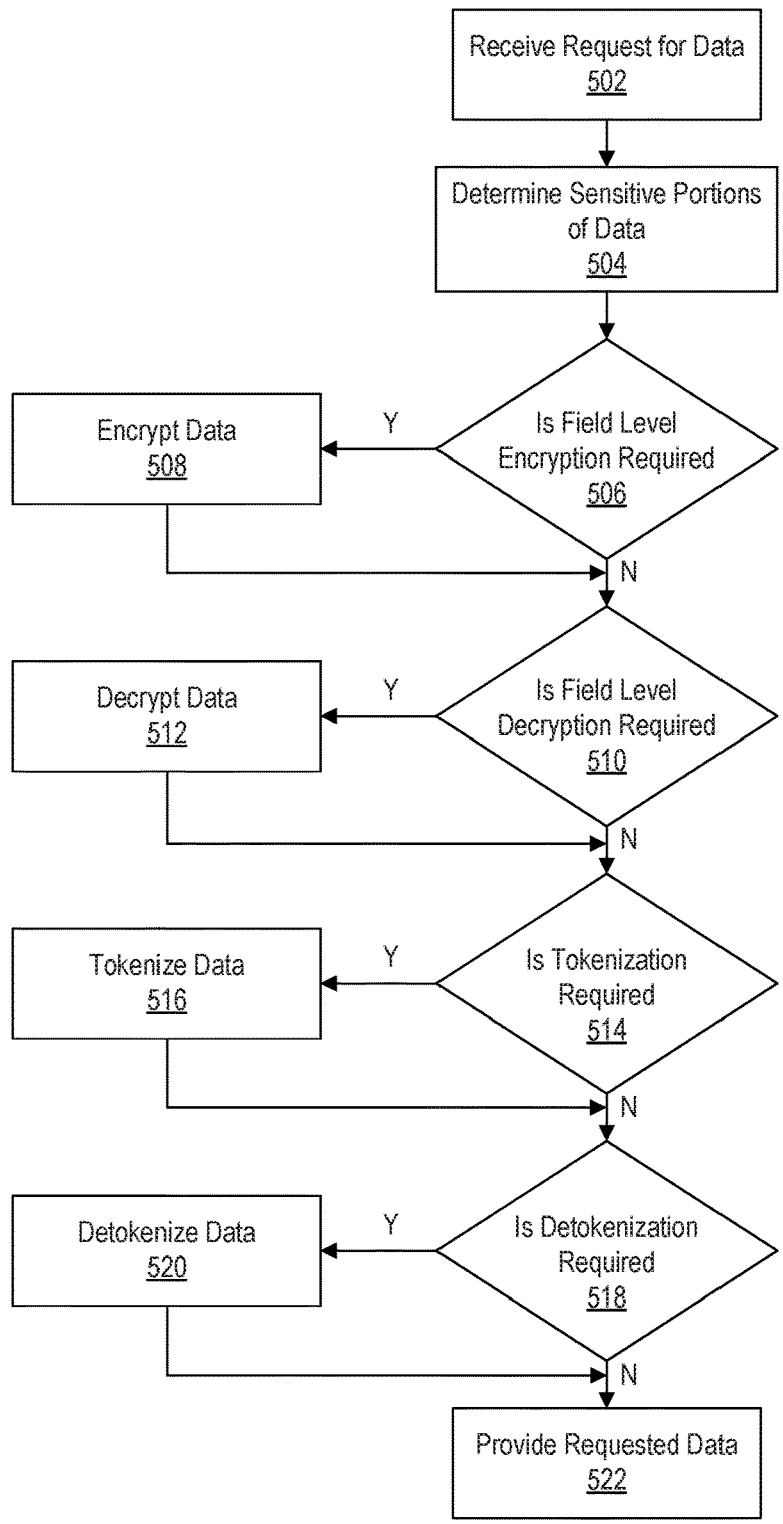
FIG. 5 is a flowchart of an exemplary method for securing data, consistent with disclosed embodiments.

FIG. 5 shows a flowchart of an exemplary process 500 for securing data. Process 500 may be performed, for example, by data security subsystem 300.

In step 502, an application, such as application 302, 304, or 306 may request information from cloud server 108. Data security subsystem 300 may receive the request. Requesting the information may include establishing a secure connection, such as an SSL or TLS connection. Based on the secure connection, cloud server 108 may monitor and/or log access to data security subsystem 300 to, for example, identify suspicious activity, restrict access by unauthorized entities, or evaluate the extent of data compromised in a security breach.

In step 504, data security subsystem 300 may determine sensitive portions of data within the requested information, such as sensitive or confidential field level data. The sensitive portions may be identified in a number of ways, such as by format, known combination, metadata tags, or a checksum using a formula such as a Luhn algorithm (e.g., modulus 10, etc.). Additionally or alternatively, the request from the application may include a call to secure-data APIs 308, requesting a particular type of data. For example, the request received in step 502 may include a call to APIs requesting tokenization, detokenization, encryption, or decryption of particular data.

In step 506, data security subsystem 300 may determine whether field level encryption should be performed on the data. This determination may be based on an indication received as a part of an API, a policy in place for providing data to the requesting application, or a policy for the particular data involved. Policies involved in step 506 may be uniform across cloud server 108 and/or data security subsystem 300, or may vary based on the use case of the data. If field level encryption is not required (step 506; NO), process 500 may pass to step 410.

If field level encryption is required (step 506; YES), process 500 may pass to step 508. In step 508, field level security system 310 may encrypt the sensitive portions of data. Any appropriate method of encryption may be used; however, an exemplary method is shown in FIG. 6.

Figure 6:
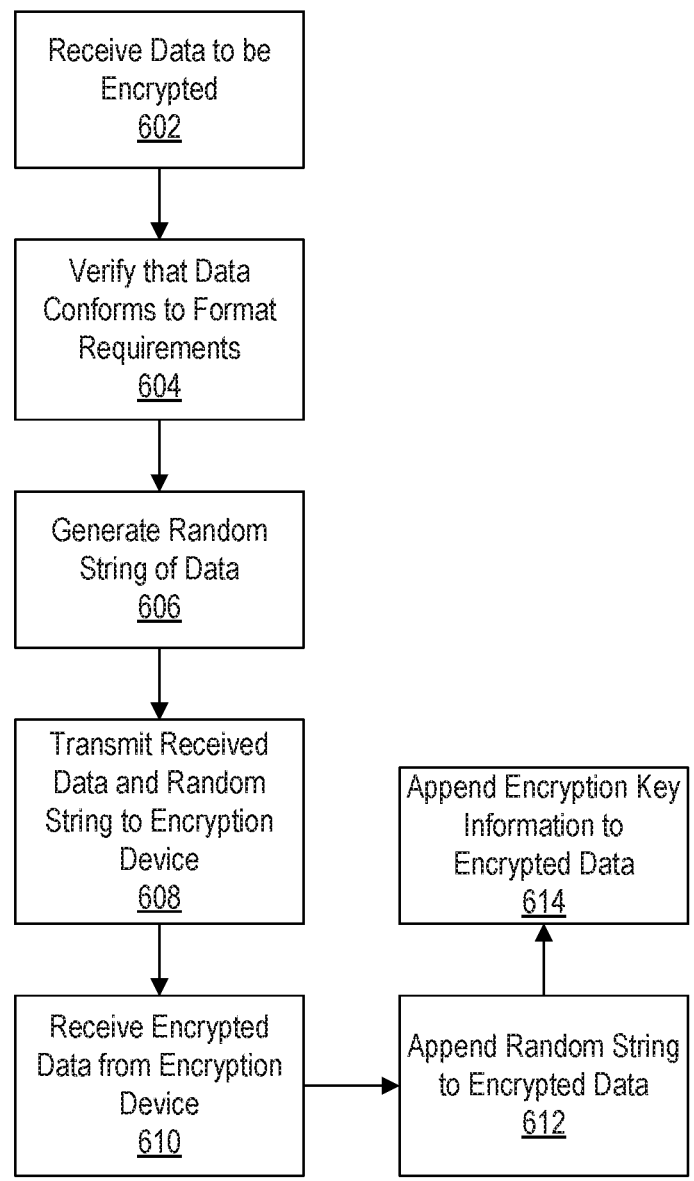
FIG. 6 is a flowchart of an exemplary method for field level encryption, consistent with disclosed embodiments.

FIG. 6 shows a flowchart of an exemplary process 600 for encrypting field level data. In step 602, field level security system 310 may receive data to be encrypted. The received data may be, for example, the sensitive portions of data determined in step 504 of FIG. 5. For instance, the received data may be a social security number (e.g. 123-45-6789).

In step 604, field level security system 310 may verify that the data conforms to format requirements for the type of data. Format requirements may vary based on the type of data involved. For example, if the type of data is a social security number, field level security system 310 may verify that the received data is a 9 digit numeric value.

In step 606, field level security system 310 may generate a random string of data. The random string of data may be generated based on any known method(s) of generating random bits or characters and any string length may be used. As an example, a 16 byte string may be used.

In step 608, field level security system 310 may transmit the received data along with the random string to an encryption device. Any form of encryption may be used, and various devices and software packages may be implemented. Encryption may be performed by one or more first party and/or third party systems and implemented through software, one or more dedicated hardware devices such as HSM 318, or any combination of hardware and software implementation.

In step 610, field level security system 310 may receive encrypted data from the encryption device. In step 612, field level security system 310 may append the random string of characters in an unencrypted form to the received encrypted data.

In step 614, field level security system 310 may append encryption key information to the encrypted data. The encryption key information may include information necessary for decryption of the information at a desired time and circumstance. A key identifier may be used such as, for example, numeric or alphanumeric identifiers.

Referring back to FIG. 5, in step 510, data security subsystem 300 may determine whether decryption should be performed on the requested data. Decryption may be necessary in instances in which the requesting application requires access to field level information that has been encrypted in its unencrypted form. This determination may be based on an indication received as a part of an API, a policy in place for providing data to the requesting application, or a policy for the particular data involved. Policies involved in step 510 may be uniform across cloud server 108 and/or data security subsystem 300, or may vary based on the use case of the data. If field level decryption is not required (step 510; NO), process 500 may pass to step 514.

If field level decryption is required (step 510; YES), process 500 may pass to step 512. In step 512, field level security system 310 may decrypt encrypted sensitive portions of data. Any appropriate method of decryption may be used; however, an exemplary method is shown in FIG. 7.

Figure 7:
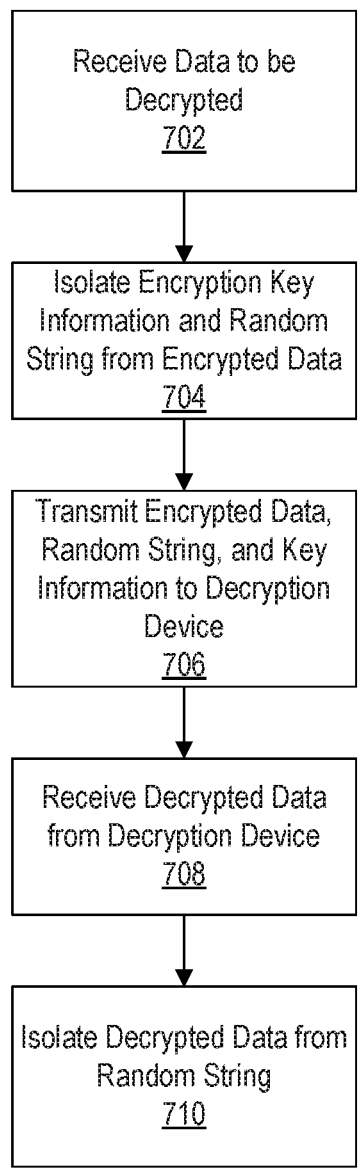
FIG. 7 is a flowchart of an exemplary method for field level decryption, consistent with disclosed embodiments.

FIG. 7 shows a flowchart of an exemplary process 700 for decrypting field level data. In step 702, field level security system 310 may receive encrypted data to be decrypted. The received data may include, for example, ciphertext included in the sensitive portions of data determined in step 504 of FIG. 5. The encrypted data may also include encryption key information and a random string of characters, as described above with respect to FIG. 6.

In step 704, field level security system 310 may isolate the encryption key information and random string of characters from the encrypted data.

In step 706, field level security system 310 may transmit the received encrypted data to a decryption device. The encryption key information and/or the random string of characters may be transmitted to the decryption device along with the encrypted data. Any appropriate device may be used, based on the type of encryption used to encrypt the encrypted data and various devices and software packages may be implemented. Decryption may be performed by one or more first party and/or third party systems and implemented through software, one or more dedicated hardware devices such as HSM 318, or any combination of hardware and software implementation.

In step 708, field level security system 310 may receive decrypted data from the decryption device. The received decrypted data may include the random string of characters.

In step 710, field level security system 310 may isolate the decrypted data from the random string of characters.

Referring back to FIG. 5, in step 514, data security subsystem 300 may determine whether tokenization should be performed on the requested data. Tokenization may be performed in cases that require data in a particular format, such as existing or legacy systems which require input of sensitive information, such as primary account numbers (PANs) or social security numbers. Such systems may be too expensive or prevalent to replace, or may be a part of an industry standard such that encryption is not feasible. Further, tokenization may be used in applications or instances that require functionality to search based on sensitive data, as tokenized data may be more practical to search than other forms of secured data. The determination of whether to use tokenization may be based on an indication received as a part of a secure-data API, a policy in place for providing data to the requesting application, a policy for the particular data involved, etc. Policies involved in step 514 may be uniform across cloud server 108 and/or data security subsystem 300, or may vary based on the use case of the data. If tokenization is not required (step 514; NO), process 500 may pass to step 518.

If tokenization is required (step 514; YES), process 500 may pass to step 516. In step 516, data field level security system 310 may generate one or more tokens to represent sensitive portions of the data. The tokens may be generated using a process integrated into field level security system 310. Tokenization logic may be implemented in software, specialized hardware, or through a combination of software and hardware. For example, a tokenization may be implemented such that sensitive operations requiring use of secret keys are achieved through hardware such as HSM 316. Any appropriate method of tokenization may be used; however, an exemplary method is shown in FIG. 8.

Figure 8:
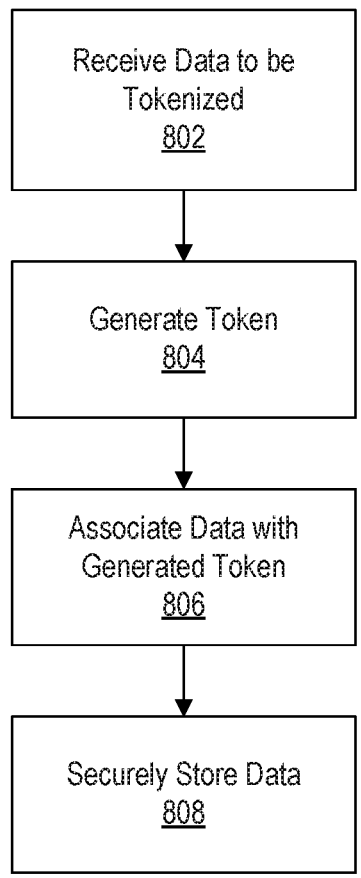
FIG. 8 is a flowchart of an exemplary method for field level tokenization, consistent with disclosed embodiments.

FIG. 8 shows a flowchart of an exemplary process 800 for tokenizing field level data. In step 802, data field level security system 310 may receive data to be tokenized. The received data may be, for example, the sensitive portions of data determined in step 504 of FIG. 5.

In step 804, data field level security system 310 may generate a token to represent the received data. The token may be generated, for example, via any implementation of software or hardware random number generator, a look up table, or may be pseudorandom, and generated based on the original data. For example, the token may be generated based on an algorithm including format-preserving encryption, such as AES-FFX. The encryption may be performed by one or more first party and/or third party systems and implemented through software, one or more dedicated hardware devices such as HSMs, or any combination of hardware and software implementation.

In step 806, data field level security system 310 may associate the generated token with the received data. The association may be saved in a database, such that the data may be later retrieved based on the token. Step 806 may be omitted in some embodiments incorporating pseudorandom tokens, as the data may be incorporated into the token, such that it may be extracted later.

In step 808, field level security system 310 may securely store the received data. For example, data security subsystem 300 may encrypt the received data prior to storage. Any form of encryption may be used, and various devices and software packages may be implemented. Encryption may be performed by one or more first party and/or third party systems and implemented through software, one or more dedicated hardware devices such as HSMs, or any combination of hardware and software implementation. Step 808 may be omitted in some embodiments incorporating pseudorandom tokens, as the data may be incorporated into the token, such that it may be extracted later.

Referring back to FIG. 5, in step 518, data security subsystem 300 may determine whether detokenization should be performed on the requested data. Detokenization may be necessary in instances in which the requesting application requires access to original field level information that has been tokenized. This determination may be based on an indication received as a part of an API, a policy in place for providing data to the requesting application, or a policy for the particular data involved. Policies involved in step 518 may be uniform across cloud server 108 and/or data security subsystem 300, or may vary based on the use case of the data. If field level detokenization is not required (step 518; NO), process 500 may pass to step 522 to provide the requested data.

If field level detokenization is required (step 518; YES), process 500 may pass to step 520. In step 520, field level security system 310 may detokenize tokenized sensitive portions of data and pass to step 522 to provide the requested data. Any appropriate method of detokenization may be used; however, an exemplary method is shown in FIG. 9.

Figure 9:
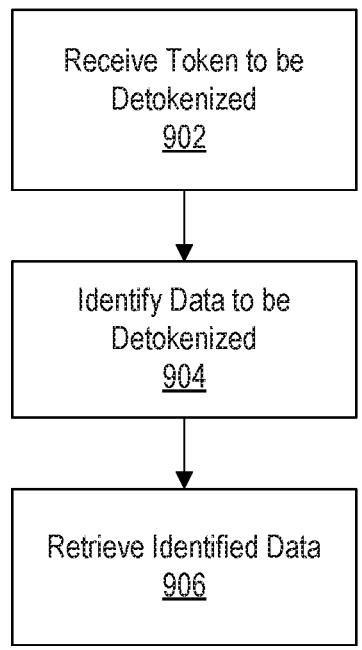
FIG. 9 is a flowchart of an exemplary method for field level detokenization, consistent with disclosed embodiments.

FIG. 9 shows a flowchart of an exemplary process 500 for detokenizing field level data. In step 902, field level security system 310 may receive one or more tokens to be detokenized. The received tokens may be, for example, included in the sensitive portions of data determined in step 504 of FIG. 5.

In step 904, field level security system 310 may identify, based on the token(s), the desired data to be detokenized. For example, data security subsystem 300 may look up the tokens in a database, which stores associations between tokens and original data used to create the tokens. Alternatively, field level security system 310 may determine that the token is pseudorandom and includes the desired data within the token.

In step 906, field level security system 310 may retrieve the identified data. The data may be retrieved from a database storing token data or, in some embodiments, such as those involving pseudorandom tokens, the data may be retrieved by extracting it from the token itself. The retrieved data may be encrypted. Field level security system 310 may transmit this encrypted data to a decryption device. Any appropriate device may be used, based on the type of encryption used to encrypt the encrypted data, and various devices and software packages may be implemented. Decryption may be performed by one or more first party and/or third party systems and implemented through software, one or more dedicated hardware devices such as HSM 318, or any combination of hardware and software implementation.

Referring back to FIG. 5, in step 422, data security subsystem 300 may provide the requested data, including any field level encrypted, field level decrypted, tokenized, or detokenized portions, to the application.

In some embodiments, multiple forms or standards of hardware and software encryption and tokenization may be implemented within a single embodiment of field level security system 310. This may be achieved by using a different alphabet for each implementation of encryption of tokenization, allowing field level security system 310 to detect the proper form or standard to be used to decrypt or detokenize.

Figure 10:
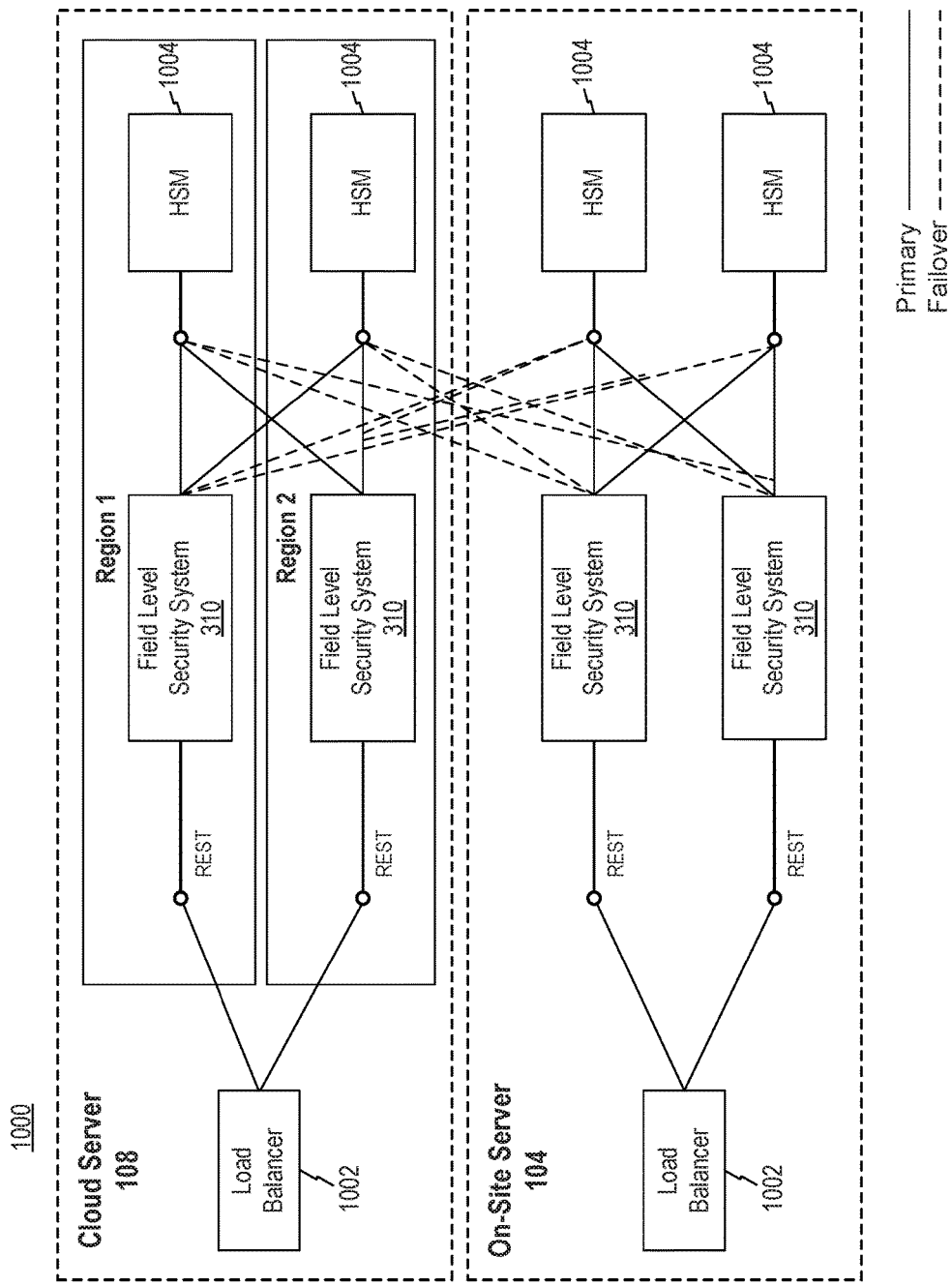
FIG. 10 is a diagram of an exemplary server configuration, consistent with disclosed embodiments.

FIG. 10 shows a diagram of an exemplary server configuration 1000. In sever configuration 1000, cloud server 108 and on-site server 104 may both be configured to receive requests for information from applications. The requests for information may formatted to comply with the REST standard, as shown in FIG. 10, or with any other format for information requests such as SOAP, XML, binary, etc.

In configuration 1000, requests for information may be received from network 102 at a load balancer 1002 associated with cloud server 108 or on-site server 104. The load balancer may direct the request to a field level security system 310 operating within the cloud server 108 or on-site server 104. The load balancer may be provided in the form of one of programs 250, may be a hardware device (such as those distributed by F5 networks), or may be provided as a service (such as the Cloud Load Balancers provided by Rackspace or Elastic Load Balancing provided by Amazon Web Services).

Load balancer 1002 may direct requests across multiple instances of field level security system 310 located in different physical locations. In some embodiments, any number of instances of field level security system 310 may be located locally to one another (e.g., in the same room, building, complex, city, etc.), remotely from one another (e.g., in a different room, building, complex, city, etc.), or in any combination of local and remote. For example, cloud server 108 may include a plurality of physical servers disposed in various regions. This may be done for a number of reasons including, for example, reduced latency and/or increased reliability in the event of an outage related to location. Connections between different physical locations may be secured by a protocol such as SSL, TLS, etc. In FIG. 10, load balancer 1002 of cloud server 108 is configured to direct requests to field level security systems located in regions 1 and 2.

As described above with respect to FIG. 3, the field level security systems 310 may employ an HSM 1004 for either or both of encryption and tokenization. Any ratio of HSMs 1004 to field level security systems 310 may be employed as appropriate based on the relative performance of the systems. FIG. 10 depicts one HSM 1004 designated for each field level security system 310. As shown in FIG. 10, failover connections may be provided such that HSMs 1004 at onsite server 104 may be utilized by field level security systems 310 of cloud server 108, and vice versa.

As shown in FIG. 10, cloud server configurations may include configurations that require assigning connections to finite resources, such as connecting load balancers 1002 to field level security systems 310 or connecting field level security systems 310 to HSMs 1004.

Figure 11:
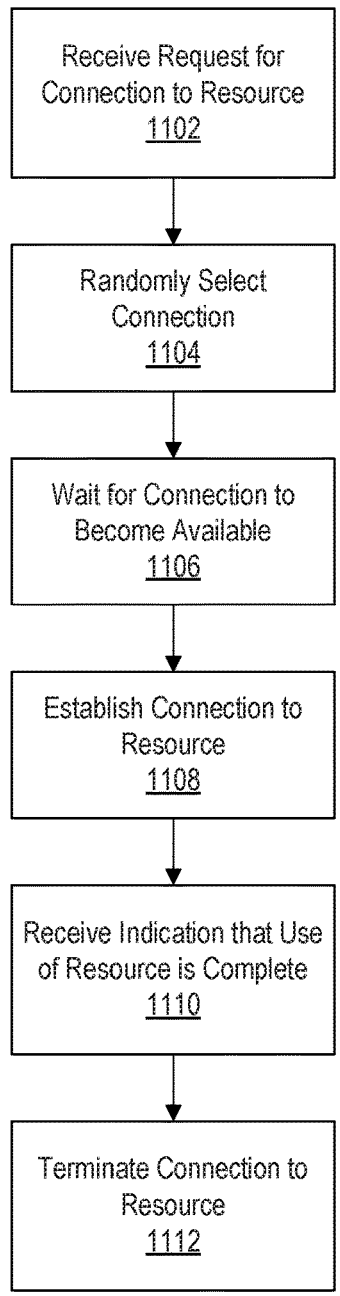
FIG. 11 is a flowchart of an exemplary method for managing server resources, consistent with disclosed embodiments.

FIG. 11 shows a flowchart of an exemplary process 1100 for managing server resources. Process 1100 is described with respect to one of load balancers 1002; however, the process could be implemented in other contexts, including as software as one of programs 250 or as a separate component of specialized hardware.

In step 1102, load balancer 1002 may receive a request for a connection to a resource. The request may be received in any communications protocol, such as REST, SOAP, XML, binary, etc.

In step 1104, load balancer 1002 may randomly select a connection of a set of potentially available connections. Any form of random selection may be employed.

In some embodiments, the selection of step 1104 may not be based on whether the selected connection is not currently in use. For example, in step 1106, load balancer 1002 may wait for the connection to become available.

After the connection is no longer in use, process 1100 may pass to step 1108. In step 1108, load balancer 1002 may establish a connection to the resource. The connection may be made over a wired connection such as a twisted-pair cable (e.g. cat 5, 5e, or 6) or a wireless connection such as one of the 802.11 standards.

In step 1110, load balancer 1002 may receive an indication that use of the resource is complete. The indication may be affirmative, such as a signal or code indicating that use of the resource is finished, or may be based on a timeout or detection of a lack of activity. After receiving the indication that use of the resource is complete, load balancer 1002 may terminate the connection to the resource in step 1112.

Figure 12:
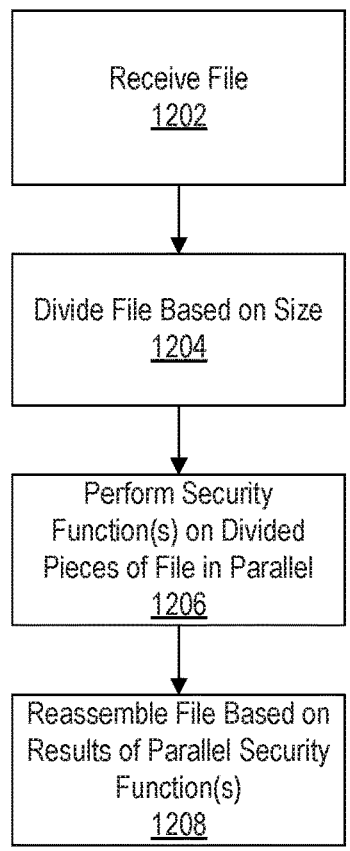
FIG. 12 is a flowchart of an exemplary method for batch or stream processing data, consistent with disclosed embodiments.

Various embodiments of data security subsystem 300 may be configured to achieve a number of cloud security functions. For example, FIG. 12 shows a process 1200 for batch or stream processing data using data security subsystem 300. In step 1202, data security subsystem 300 may receive a file containing sensitive data. The file may be received based on a policy that all files be processed, by a detection of sensitive information within the file, or based on detection of an attribute suggesting that the file may contain sensitive information.

In step 1204, data security subsystem 300 may divide the file based on its size. For example, the file may be divided into parts such that each part contains a particular amount of data. The size of the divided parts may be defined by an amount of data, number of fields, number of pieces of sensitive data within the divided part, or other units. Files under a given size, based on any of the above (amount of data, number of fields, pieces of sensitive data, etc.) may not be divided. In some embodiments, division of the file may be achieved by a commercially available hardware or software batch processing solution.

In step 1206, data security subsystem 300 may perform security function(s) on the divided pieces of the file in parallel. The security functions may include field level encryption, decryption, tokenization, and/or detokenization, as described in relation to FIG. 5. The security functions may be achieved via calls to secure-data APIs 308 of one or more field level security systems 310. Multiple calls to secure-data APIs 308 may be made simultaneously or nearly simultaneously.

In step 1208, data security subsystem 300 may reassemble the file based on the results of the security functions performed in parallel. The file may be reassembled by the same batch processing solution used in step 1204.

Figure 13:
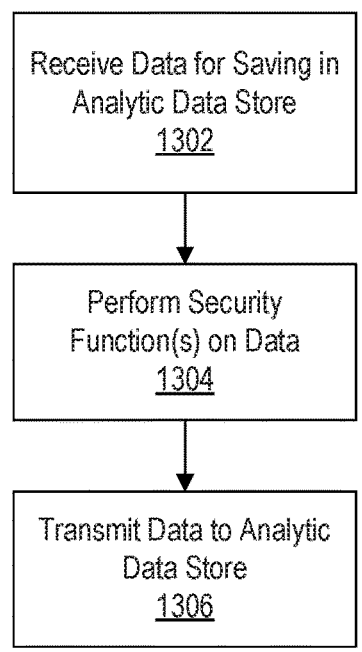
FIG. 13 is a flowchart of an exemplary method for protecting data before ingestion into an analytic data store, consistent with disclosed embodiments.

As another example of a configuration of data security subsystem 300, FIG. 13 shows a process 1300 for protecting data before ingestion into an analytic data store. The analytic data store may process the data in various ways and store it such that it can be accessed by numerous systems and/or users. Thus, protecting sensitive field level data within a file or other unit of data before it is ingested into the analytic data store may protect the field level data from being compromised in the event that security measures associated with the data store are defeated.

In step 1302, data security subsystem 300 may receive data for ingestion into an analytic data store.

In step 1304, data security subsystem may perform security function(s) on the data. The security functions may include field level encryption, decryption, tokenization, and/or detokenization, as described in relation to FIG. 5. The security functions may be achieved via calls to secure-data APIs 308 of one or more field level security systems 310. Further, the data may be divided prior to performing the security function(s), as described with respect to FIG. 12.

In step 1306, data security subsystem 300 may provide the data, modified by the performed security functions, to the analytic data store.

Figure 14:
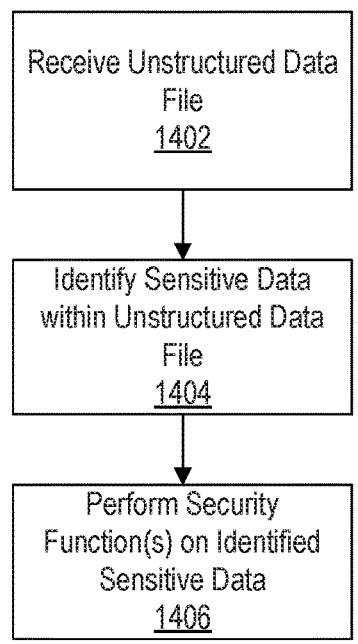
FIG. 14 is a flowchart of an exemplary method for protecting field level data within an unstructured data file, consistent with disclosed embodiments.

As another example of a configuration of data security subsystem 300, FIG. 14 shows a process 1400 for protecting field level data within an unstructured data file. In step 1402, data security subsystem 300 may receive a file comprising unstructured data.

In step 1404, data security subsystem 300 may identify sensitive data within the unstructured data file. The sensitive portions may be identified in a number of ways, such as by format, known combination, metadata tags, or a checksum using a formula such as a Luhn algorithm (e.g., modulus 10, etc.). A commercial solution for processing unstructured data, such as an implementation of the Hadoop technology, may be employed to identify the sensitive data.

In step 1406, data security subsystem 300 may perform security function(s) on the identified sensitive data within the unstructured data file. The security functions may include field level encryption, decryption, tokenization, and/or detokenization, as described in relation to FIG. 5. The security functions may be achieved via calls to secure-data APIs 308 of one or more field level security systems 310.

Figure 15:
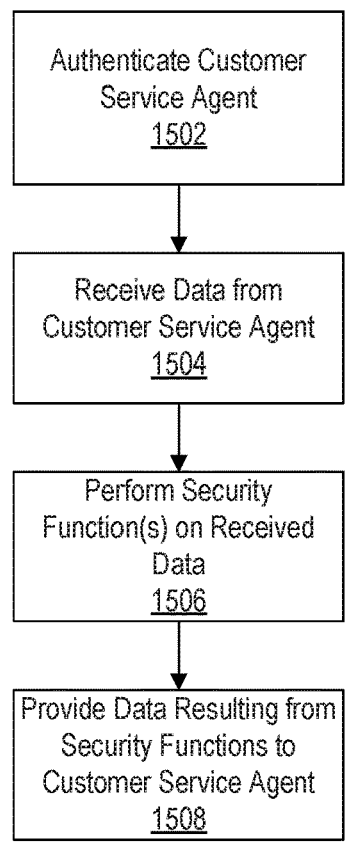
FIG. 15 is a flowchart of an exemplary method for a customer service agent to convert data between secured and unsecured forms, consistent with disclosed embodiments.

As another example of a configuration of data security subsystem 300, FIG. 15 shows a process 1500 for a customer service agent to convert data between secured and unsecured forms. The customer service agent may be user 112 accessing cloud server 108 and/or on site server 104 via user device 110 or on-site terminal 106. The customer service agent may require access to unsecured field level data such as a PCI/NPI data in order to provide support to a customer such as an individual or business consumer of financial services.

In step 1502, data security subsystem 300 may authenticate the customer service agent. Data security subsystem 300 may authenticate the customer service agent based on a username and password, biometric data, an authentication fob, or a combination of authentication methods. The customer service agent's access may be provided over a secured connection and logged, as described with respect to step 502 of FIG. 5.

In step 1504, data security subsystem 300 may receive data from the customer service agent. The data may be field level data such as a token or ciphertext. For example, the customer service agent may have access to a token representing a customer's social security number, but may need access to the social security number itself in order to provide support to the customer. Data security subsystem 300 may receive the token from the customer service agent.

In step 1506, data security subsystem 300 may perform security function(s) on the received data. The security functions may include field level encryption, decryption, tokenization, and/or detokenization, as described in relation to FIG. 5. The security functions may be achieved via calls to secure-data APIs 308 of one or more field level security systems 310. For example, data security subsystem 300 may call an API 308 to convert the received token representing the customer's social security number to the social security number itself.

In step 1508, data security subsystem may provide data resulting from the security functions to the customer service agent.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, Python, Go or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations, or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for securing data, the system comprising:
one or more processors; and
a memory having stored thereon instructions that, when executed by the one or more processors, cause the one or more processors to perform operations comprising:
  receiving, from a requesting application, a request for data over a network, the request comprising a call to a secure-data Application Program Interface (API) and the call comprising an indication of confidential portions of data within the requested data;
  identifying, based on the call to the secure-data API, one or more confidential portions of data within the requested data;
  determining, based on a policy for providing data to the requesting application, whether the identified one or more confidential portions of data are to be secured;
  transmitting, based on a result of the determination, the confidential portions of data to a hardware device configured to secure the confidential portions of data; and
  receiving, from the hardware device, secured data generated based on the transmitted confidential portions of data.

2. The system of claim 1, wherein the confidential portions of data are associated with personally identifying information.

3. The system of claim 1, wherein the secured data is encrypted.

4. The system of claim 3, wherein the hardware device is a hardware security module.

5. The system of claim 1, wherein the secured data is tokenized.

6. The system of claim 5, wherein the secured data comprises data that has been tokenized using both software and hardware.

7. The system of claim 1, wherein the request is received via an application program interface.

8. The system of claim 7, wherein the application program interface requires mutual authentication.

9. The system of claim 7, wherein the application program interface comprises an application program interface conforming to a representational state transfer (REST) standard.

10. The system of claim 1 wherein transmitting the confidential portions of data comprises transmitting the confidential portions of data over a secured connection to a hardware device located remotely from the one or more processors.

11. The system of claim 1, wherein the further comprise establishing a secure connection with a field level security device.

12. The system of claim 11, wherein the secure connection is one of a Secure Sockets Layer (SSL) or a Transport Security Layer (TLS) connection.

13. The system of claim 1, wherein identifying the one or more confidential portions of data comprises identifying one or more confidential portions of data based on at least one of a format, a checksum, or metadata associated with the one or more confidential portions of data.

14. The system of claim 1, wherein the call to the secure-data API comprises a call to the secure-data API requesting at least one of a tokenization, a detokenization, an encryption, or a decryption of part of the requested data.

15. The system of claim 1, wherein the operations further comprise:
   determining whether an encryption operation needs to be performed on the one or more confidential portions of data; and
   transmitting, based on a result of the determination that an encryption operation needs to be performed on the one or more confidential portions of data, the confidential portions of data to a hardware device configured to secure the confidential portions of data.

16. The system of claim 15, wherein determining whether an encryption operation needs to be performed on the one or more confidential portions of data is based on at least one of the received request, a policy relating to the received request, or a policy relating to the requested data.

17. The system of claim 1, wherein the secured data comprises encryption key information.

18. The system of claim 1, wherein the operations further comprise:
   determining whether a decryption operation needs to be performed on the secured data received from the hardware device; and
   decrypting, based on a result of the determination that a decryption operation needs to be performed on the secured data, the secured data.

19. The system of claim 18, wherein determining whether a decryption operation needs to be performed determining whether a decryption operation needs to be performed, based on at least one of the received request, a policy relating to the received request, or a policy relating to the requested data.

* * * * *